Figure 1:
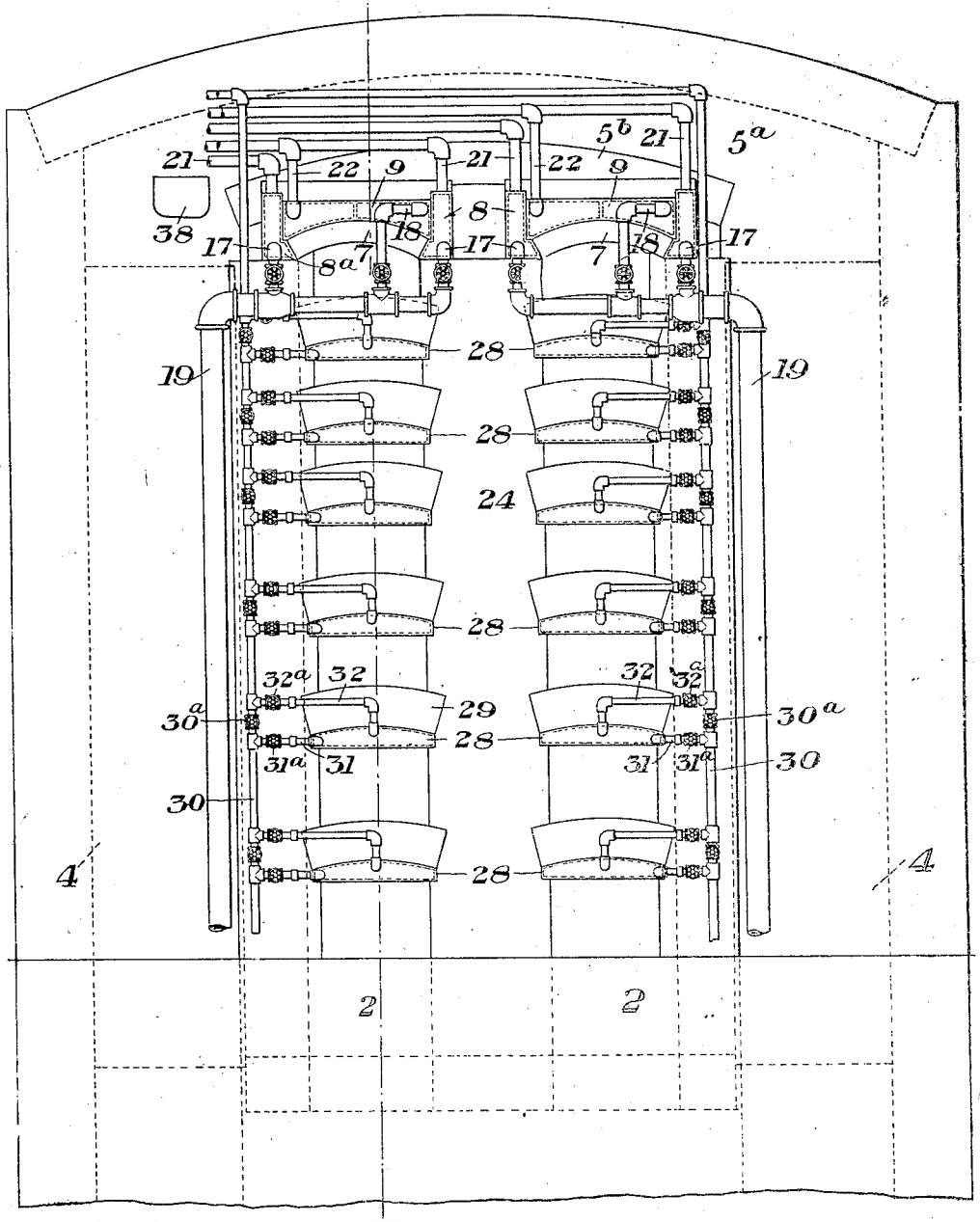

L. L. KNOX.
REGENERATIVE REVERSING FURNACE.
APPLICATION FILED MAY 14, 1908.

919,185.

Patented Apr. 20, 1909.
5 SHEETS—SHEET 1.

WITNESSES
R. H. Balderson
G. B. Fleming

INVENTOR
L. L. Knox,
by Bakewell, Byrnes & Parmelee,
his Attys.

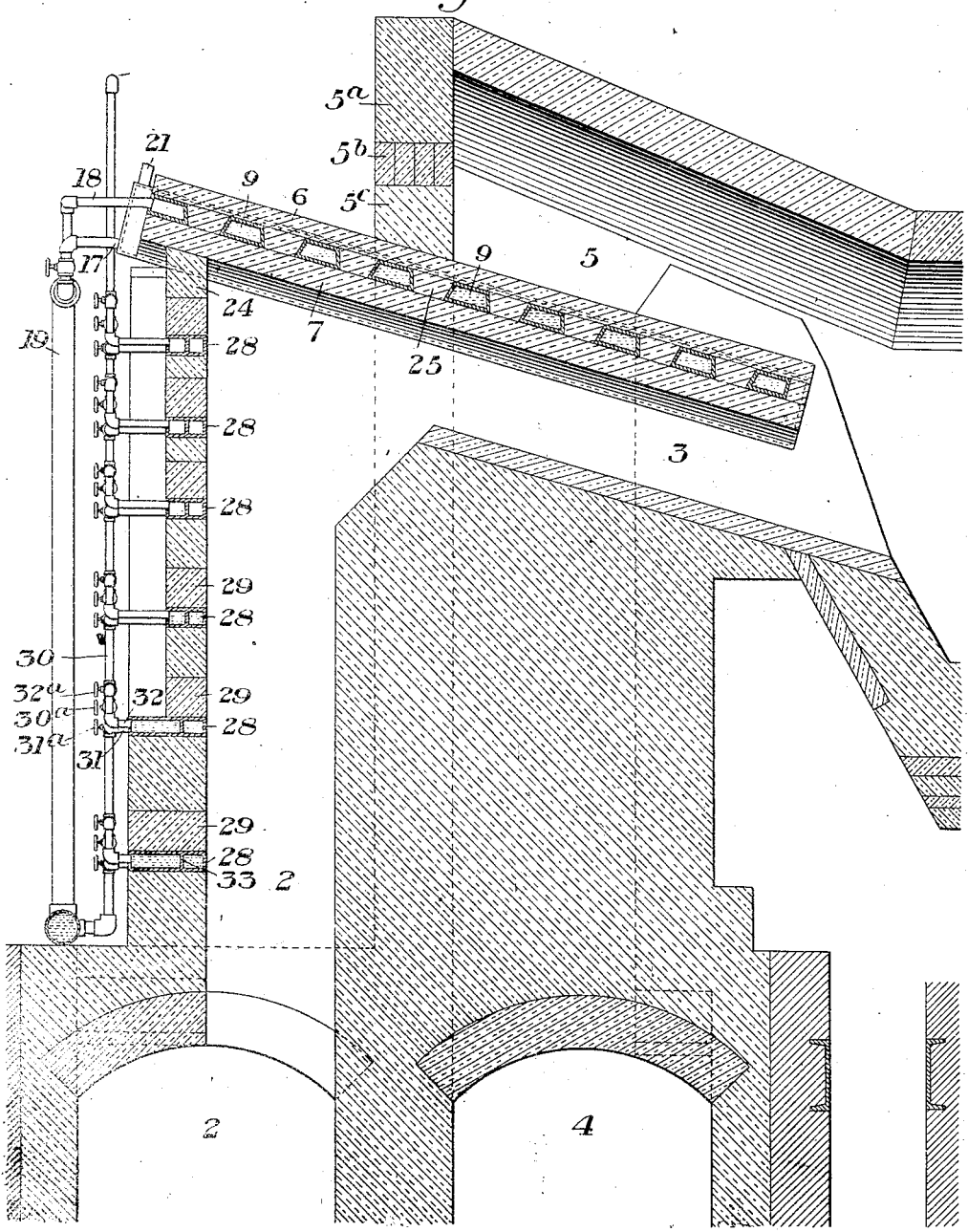

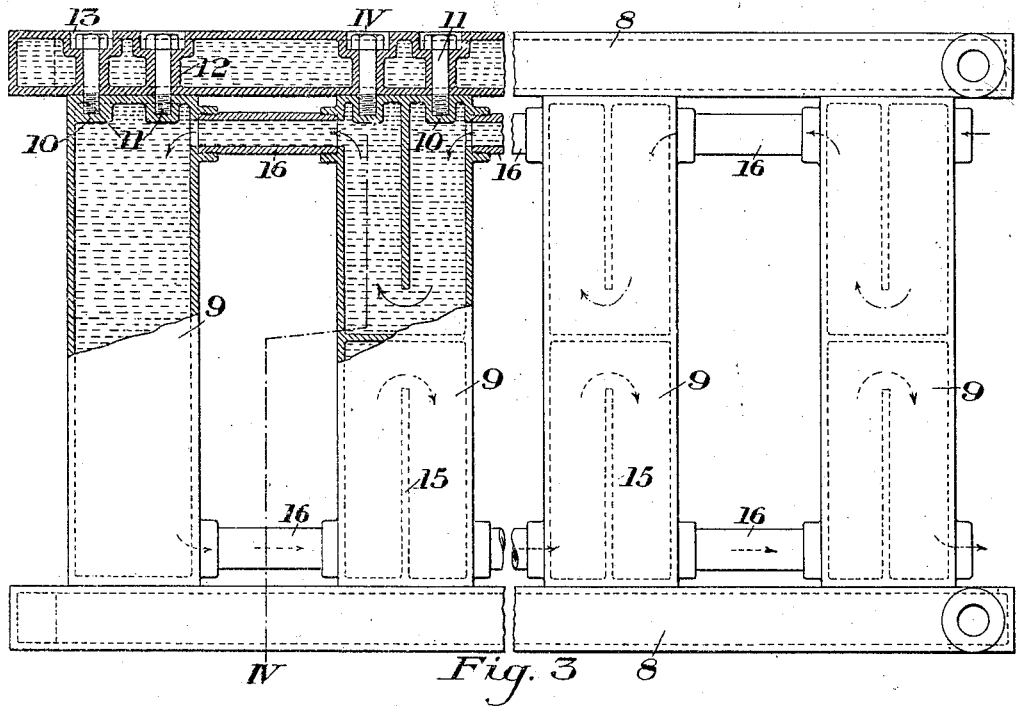
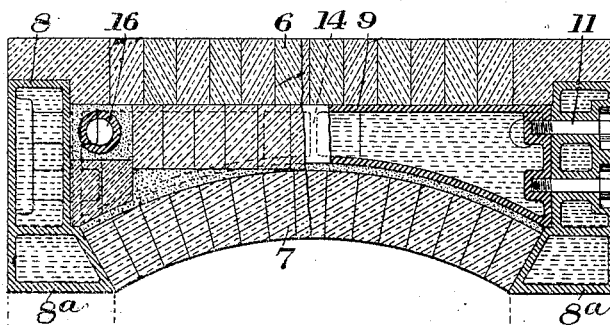
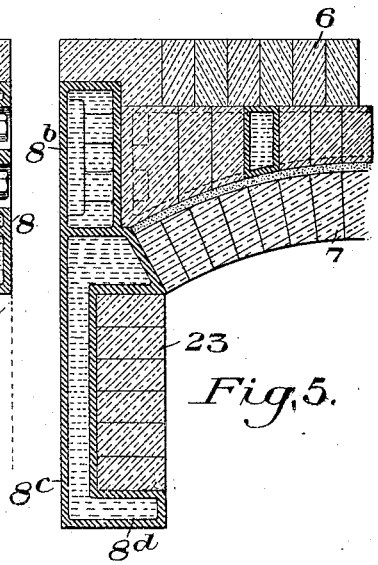

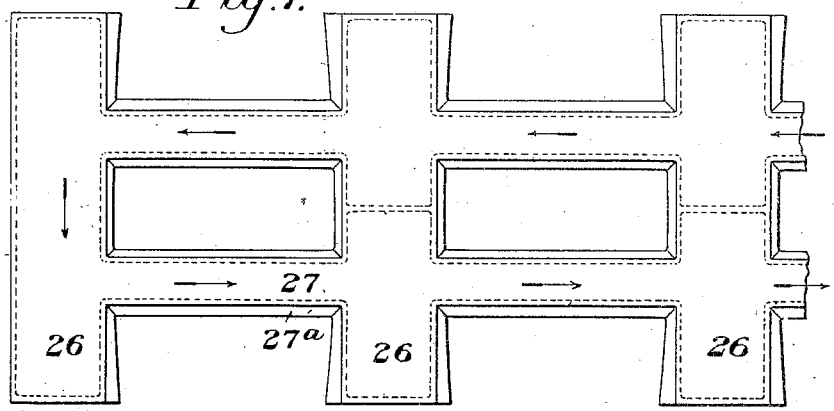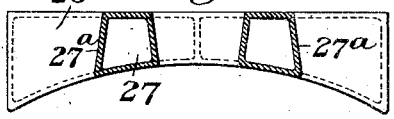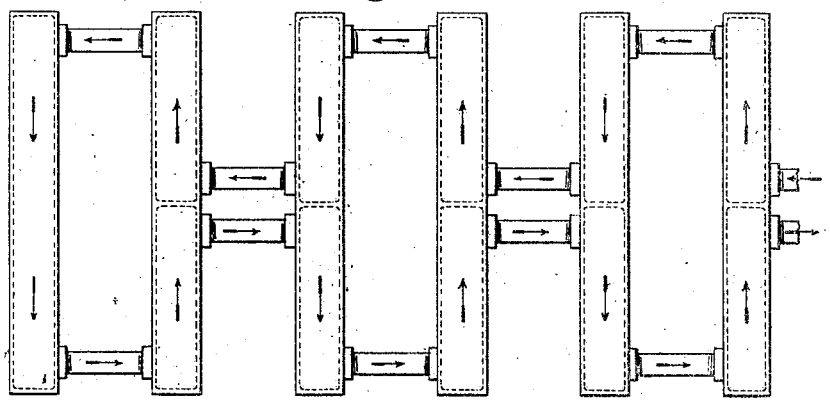

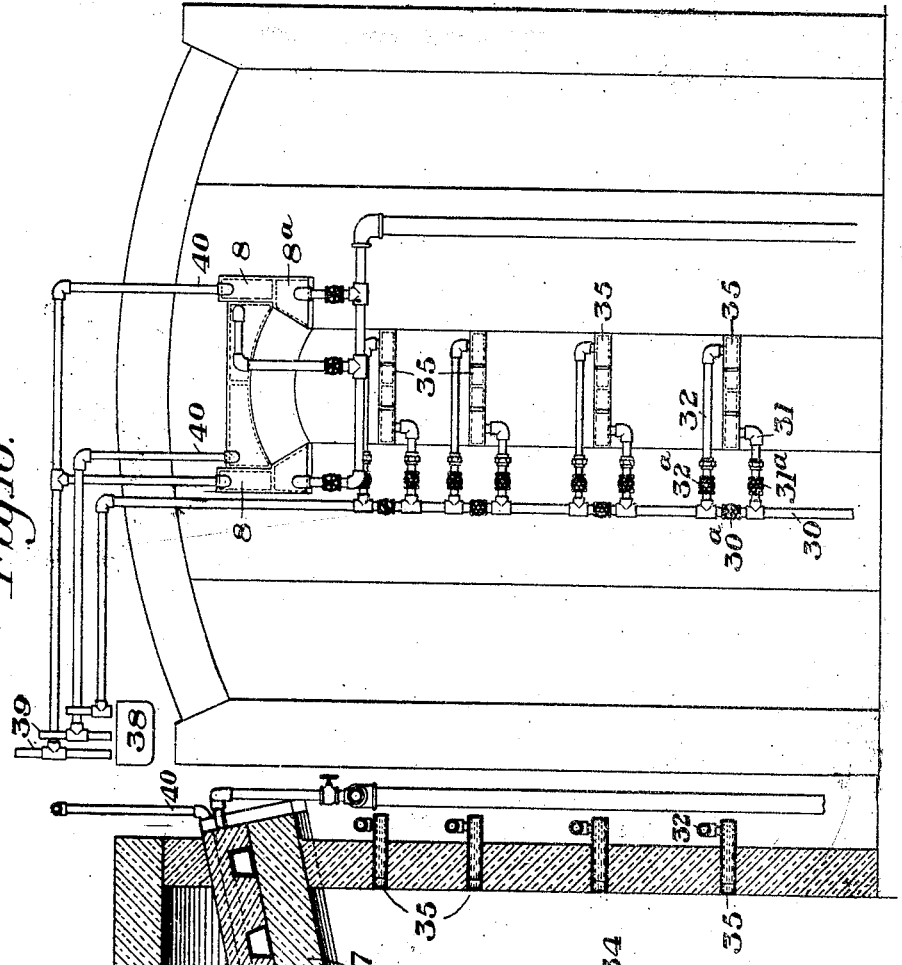
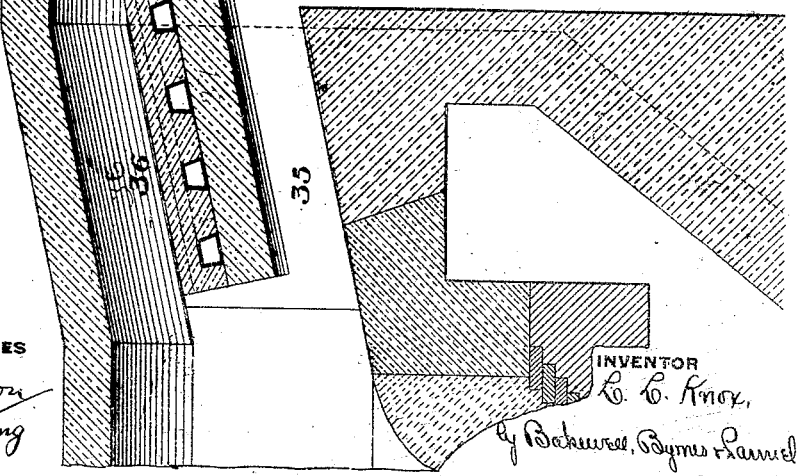

UNITED STATES PATENT OFFICE.

LUTHER L. KNOX, OF BEN AVON, PENNSYLVANIA, ASSIGNOR TO KEYSTONE FURNACE CONSTRUCTION COMPANY, OF PITTSBURG, PENNSYLVANIA, A CORPORATION OF PENN-SYLVANIA.

REGENERATIVE REVERSING FURNACE.

No. 919,185.　　　　Specification of Letters Patent.　　　Patented April 20, 1909.

Application filed May 14, 1908.　Serial No. 432,867.

*To all whom it may concern:*

Be it known that I, LUTHER L. KNOX, of Ben Avon, Allegheny county, Pennsylvania, have invented a new and useful Improvement in Regenerative Reversing Furnaces, of which the following is a full, clear, and exact description, reference being had to the accompanying drawings, forming part of this specification, in which—

Figure 1 is an end elevation, showing one form of furnace embodying my invention; Fig. 2 is a vertical section on the line II—II of Fig. 1; Fig. 3 is a plan view partly broken away of the cooling boxes for the arch between the gas and air ports; Fig. 4 is an enlarged cross section through the arch on the line IV—IV of Fig. 2; Fig. 5 is a partial section showing a modified form of the arch; Figs. 6, 7 and 8 are detail views showing modified constructions of the cooling boxes for the arch; Fig. 9 is a vertical section; and Fig. 10 an elevation of another form of furnace embodying my invention.

My invention has relation to regenerative reversing furnaces and is designed to provide means of novel and effective character for protecting the arch which separates the gas and air ports; also to provide a novel construction of arch which can be readily removed and replaced when necessary; and also to provide means of improved character for protecting the front walls of the gas ports from the destructive action of the hot gases.

The precise nature of my invention will be best understood by reference to the accompanying drawings, in which I have shown different embodiments thereof, it being premised, however, that various changes may be made in the details of construction and arrangement by those skilled in the art without departing from the spirit and scope of my invention, as defined in the appended claims.

Figs. 1 and 2 of the drawings illustrate a regenerative reversing furnace of the open hearth type having two gas ports or flues 2, which extend upwardly at the central portion of the furnace and which communicate with the interior of the furnace through the arched passages 3. The air ports 4 lead upwardly at the sides of the furnace and communicate therewith by means of the passage 5. My invention is largely concerned with the construction of the arch which separates the two passages 3 and 5. This arch consists of an arrangement of metallic cooling boxes, one form of which is shown in Fig. 3, and which support an upper layer 6 of bricks or other refractory material, which constitutes the floor of the passage 5, and also an arch 7 of firebrick or other refractory material, which forms the roof of the gas passage 3. In the form of furnace shown in Figs. 1 and 2, I prefer to form a separate arch of this character for each of the gas ports or flues.

As shown in Figs. 3 and 4, the cooling boxes in each arch comprise hollow side portions 8, with a plurality of transverse hollow connections 9, which may be secured to the side portions in any convenient manner. For this purpose, I have shown the closed end portions of these transverse boxes as having seats 10, to receive screws or bolts 11, which extend through interior bosses 12, within the side portions 8, and whose heads are seated in the countersinks 13, in the outer faces of said side portions. By this arrangement, the bolts are surrounded and protected by the water. In the arrangement shown in Fig. 3, each of the transverse boxes, except that at the inner end, is provided with an intermediate baffle 14, dividing its interior into two separate portions, each of which has therein a baffle 15. Adjacent boxes are connected by pipe connections 16, and the circulation of the water through the several boxes and their different compartments may be readily traced by the arrows on Fig. 3, without further detail description thereof. The hollow side portions 8 are also provided with circulating connections 17, as shown in Fig. 1. These connections 17 together with the inlet connections 18 for the transverse boxes may be all supplied by connection with the main supply pipes 19. 21 designates the outlet or discharge pipes for the side members 8 and 22 designates the discharge connections for the transverse boxes.

For the purpose of supporting the lower arch 7, each of the side members 8 is formed with a downward extension $8^a$, having beveled inner faces which carry the arch. In the modification shown in Fig. 5, the side portions $8^b$ are extended downwardly in the form of water legs $8^c$, having each a foot portion $8^d$ to carry the side walls 23 of the flue or passage 3.

The entire arch is removably supported upon the side walls of the furnace and rests upon the front walls 24, and may be withdrawn from the furnace and entirely replaced when necessary. To permit this, the front wall 5ª of the flue 5 is formed with an arch 5ᵇ, extending transversely over the cooling arch. Below this arch 5ᵇ, the space is filled in with bricks 5ᶜ, which can be readily removed. The transverse cooling boxes of the arch are preferably formed with inclined side walls, as best shown in Fig. 2, for the purpose of forming key-shaped spaces to retain the intervening brickwork 25.

Fig. 6 shows a modified form of the cooling boxes in which the water-circulating connections are somewhat differently arranged. The water circulation is indicated by the arrows, and it will be understood without detail description, the general arrangement and construction of the boxes, aside from the interior of the baffling and the circulating connections, being the same as that shown in Figs. 3 and 4.

Figs. 7 and 8 show another modification in which there are a number of transverse cooling boxes 26, which are, in turn, connected by longitudinally arranged cooling boxes 27, preferably cast integrally therewith, these latter also having inclined lateral walls 27ª, for the purpose of keying the inset brickwork therein. I also preferably provide the front wall 24 of the gas port 2, with a plurality of cooling boxes 28, which are preferably set into such wall. As shown in Fig. 1, an arch 29 is built over each of these boxes and the boxes are each capable of removal from the arches, should they become burned out. Each of these boxes 28 is preferably connected with a supply pipe 30, by an inlet pipe 31, and an outlet pipe 32, having respectively the valves 31ª and 32ª. The supply pipe 30 also has a valve 30ª between each pair of connections 31 and 32. By this arrangement of pipes and valves, water can be shut out of any box of the series, to permit it to be removed without disturbing the circulation in the other boxes. For this purpose, the various circulating pipe connections are provided with detachable unions or connections. Each of the boxes is provided with suitable interior baffling 33, to provide for a complete water circulation therethrough. As shown in Fig. 1, the cooler water enters each box at its lowest point and leaves said box at its highest point, thereby providing for a continual ascending circulation through the series of boxes. The various discharge pipes of the water-circulating systems may be arranged to discharge at any desired point. In Figs. 1 and 9, I have shown them as being arranged to discharge into a trough or receptacle 38, their discharge ends having open nipples 39, which will permit of the escape of any steam which may form in the pipes. This arrangement will also prevent siphoning of the water from the systems.

Figs. 9 and 10 show the application of my invention to a furnace having a single central gas port 34. This gas port communicates with the interior of the furnace by the passage 35. 36 designates the air inlet, and 37 is the arch which separates the gas and air inlet passages. This arch is removable and is of the same construction as that of Figs. 1, 2, 3 and 4. The front wall of the port 34 is provided with a series of inset cooling boxes 35. As shown, these are flat boxes which are set into the wall of the furnace. The water circulation through these boxes is effected by means of the connecting pipes 40, which are arranged in a similar manner to those for the boxes 28 of Fig. 1, so as to permit the water to be shut out from any box, without disturbing the circulation through the other boxes.

My invention provides for a complete water circulation through those portions of the furnace walls which are most exposed to the destructive action of the hot gases, while at the same time, the walls are not cooled to an extent which will chill the incoming air and gas.

The arch between the gas and air ports may be thoroughly cooled by water circulation through the unclosed cooling boxes, thus greatly extending the life of these arches, and should they eventually become burned out, they can be readily removed and replaced, the entire arch being removable as a unit, the cooling members being arranged to carry and support the entire brickwork of the arch. The provision of the cooling boxes in the front walls of the gas ports effectually protects these walls from the burning out by the hot gases directed against them when the furnace is reversed. It will be understood that the ports at both ends of the furnaces are provided with a similar removable arch, and with similar cooling means to those which I have shown and described in connection with one end of the furnace.

Various changes may be made in my invention. Thus, the water-cooling boxes within the arch may be constructed and connected in various other ways than those described; the interior baffling and the arrangement of the water-circulating pipes may be largely varied, and other changes in details may be made.

What I claim is:

1. In a regenerative reversing furnace, a removable arch separating the gas and air ports, said arch comprising hollow metallic side members and transverse hollow members, water-circulating connections for the side and transverse members, and an upper refractory covering for said members carried thereby, and a lower refractory arch carried by said side members, substantially as described.

2. In a furnace of the type described, an arch separating the gas and air ports, said arch having hollow metallic side members, transverse hollow members connected to the side members, and water-circulating connections for the side and transverse members, substantially as described.

3. In a furnace of the character described, an arch separating the gas and air ports, said arch having hollow metallic side members supported on the side walls of the furnace, transverse members connected to the side members, water-circulating connections for the side members, water-circulating connections between the transverse members, and brickwork supported by said side and transverse members and constituting the upper and lower surfaces of the arch, substantially as described.

4. In a furnace of the character described, an arch separating the gas and air ports, said arch having longitudinally extending hollow metallic members supported on the walls of the furnace and having downward extensions, transverse water boxes secured to and extending between the side members, water-circulating connections for the side members and for the transverse boxes, a refractory body supported upon and between the side members and the transverse boxes, and a lower refractory arch supported by the downward extensions of the side members, substantially as described.

5. In a furnace of the character described, an arch separating the gas and air ports, said arch having longitudinally extending hollow metallic members supported on the walls of the furnace and having downward extensions, transverse water boxes secured to and extending between the side members, water-circulating connections for the side members and for the transverse boxes, a refractory body supported upon and between the side members and the transverse boxes, and a lower refractory arch supported by the downward extensions of the side members, said arch being bodily insertible into and removable from the furnace, substantially as described.

In testimony whereof, I have hereunto set my hand.

LUTHER L. KNOX.

Witnesses:
 H. M. CORWIN,
 GEO. H. PARMELEE.